United States Patent [19]

Ferentchak et al.

[11] Patent Number: 4,708,967

[45] Date of Patent: Nov. 24, 1987

[54] THERMOSETTING RESIN BINDER PARTICLES AND METHODS FOR MAKING WAFERBOARD

[75] Inventors: Rudolph Ferentchak, New Providence; James F. Kozischek, Belvidere; Jerome E. Schwartz, Bloomfield, all of N.J.

[73] Assignee: Reheis Chemical Company, Inc., Berkeley Heights, N.J.

[21] Appl. No.: 843,949

[22] Filed: Mar. 25, 1986

[51] Int. Cl.$^4$ ............................................. C08J 9/32
[52] U.S. Cl. ..................................... 521/56; 264/109; 521/181; 521/187; 521/188; 159/4.3; 159/48.1
[58] Field of Search .................. 521/56, 181, 187, 188

[56] References Cited

U.S. PATENT DOCUMENTS

| | | | |
|---|---|---|---|
| 2,773,790 | 12/1956 | Clark | 154/45.9 |
| 2,797,201 | 6/1957 | Veatch et al. | 521/64 |
| 2,835,622 | 5/1958 | Clark | 154/110 |
| 2,929,106 | 3/1960 | Snow | 521/56 |
| 3,371,053 | 2/1968 | Raskin | 521/56 |
| 3,615,972 | 10/1971 | Morehouse, Jr. et al. | 521/56 |
| 3,779,957 | 12/1973 | Vassiliades et al. | 521/181 |
| 3,781,230 | 12/1973 | Vassiliades et al. | 521/181 |
| 3,960,583 | 6/1976 | Netting et al. | 521/54 |
| 4,089,120 | 5/1978 | Kozischek | 264/8 |
| 4,098,770 | 7/1978 | Berchem et al. | 528/130 |
| 4,147,766 | 4/1979 | Kozischek | 34/10 |
| 4,405,373 | 9/1983 | Kool et al. | 521/56 |
| 4,421,562 | 12/1983 | Sands | 521/56 |
| 4,430,155 | 2/1984 | Kozischek | 159/48.1 |
| 4,537,941 | 8/1985 | Kambanis | 527/403 |

*Primary Examiner*—Morton Foelak
*Attorney, Agent, or Firm*—Panitch Schwarze Jacobs and Nadel

[57] ABSTRACT

Spray dried thermosetting resin powders in an intermediate polymeric stage are produced in the form of hollow, thick-walled, macrospherical particles having a bulk density greater than about 35 lbs/ft$^3$ and having particle diameters predominantly in the range of about 10 to 74 microns, preferably averaging about 30 microns in diameter with greater than 90% of the particles being in the 10 to 74 micron range. The powder is produced by centrifugal atomization of a concentrated resin solution through a porous sintered metal filter in a spray drying chamber, preferably without diluting or preheating the solution and without heating the resinous material above about 160° F. during spray drying. The particles are advantageously used in the dry process molding of consolidated wood fiber structures, such as waferboard and chipboard, in which wood fiber elements mixed with the resin powder are consolidated under heat and pressure sufficient to cause the powder to melt, flow and cure.

23 Claims, No Drawings

THERMOSETTING RESIN BINDER PARTICLES AND METHODS FOR MAKING WAFERBOARD

FIELD OF THE INVENTION

The present invention relates to the production of waferboards molded from fibrous elements, particularly consolidated wood chips or wafers. More particularly, the invention relates to improved thermosetting resin binder powders and their use in the manufacture of waferboard and the like.

BACKGROUND OF THE INVENTION

Composite molded boards of fibrous or woody material bound together with a small amount of thermosetting resinous material have been known for thirty years or more. See for example U.S. Pat. No. 2,773,790; 2,835,622 and other patents of James d'A. Clark. These structural boards are made by dry process molding under heat and pressure and are referred to as waferboards, chipboards and similar terms. As used herein, these terms will be understood to include all types of dry process boards wherein the woody or fibrous elements are substantially dry (less than 25% moisture), which may or may not be coated with 1-2% wax (used to enhance the adherence of the resin particles to the wood), and wherein the thermosetting resinous binder material is introduced in a substantially dry powder form. This is in contrast to wet or moist processes for making particle board or the like in which the woody or fibrous elements are laid down in a slurry or the resinous binder is in a solution or other liquid form.

Although waferboard has only about 80% the strength of plywood, and must therefore be made thicker to achieve equal strength, it is much cheaper to make than plywood and has gained wide acceptance in the last five to ten years. However, due to the heavy competition among various types of molded composition boards, the economics of production of waferboards are quite critical.

Waferboard construction panels are manufactured by a dry process in which wood wafers are bound together with a thermosetting resin under high temperature and pressure. The resin is generally a phenol formaldehyde, although other thermosetting resins such as urea formaldehydes and melamine formaldehydes can be used. Prior to the application of heat and pressure in the molding step, the resin is in a dry powder form and an intermediate polymeric stage. For example, a B stage resin (thermoplastic) powder is mixed with the wood wafers. Upon application of heat and pressure, the resin melts to coat the wafers and is then cured to the C stage.

In the process of making waferboards, it is desirable to have resin particles which are fine enough to give good distribution when coating wafers, but not so fine that dusting becomes a health and housekeeping problem. Therefore, the waferboard industry aims for a resin powder which has predominantly particles between 10 and 74 microns.

Although the resin comprises only about 1 to 4, and preferably about 2 - 2.5 weight percent of the finished board, the resin is expensive, and even a ¼ percent increase or decrease in the resin required can make a large difference in the economics of waferboard production. It is therefore important that there be good dispersion of the resin on the wood fiber elements (e.g., wafers). To this end large particles must be minimized or eliminated and small particles, but not fines, must predominate.

Powders of phenol formaldehyde resins are typically produced by spray drying an aqueous solution of the resin (see for example U.S. Pat. No. 4,098,770). However, commercially available atomization systems used in spray drying phenol formaldehydes do not achieve the desired particle size distribution. Thus, if drying conditions are adjusted to minimize the fine particles (less than 10 microns), a large percentage of the particles are over 74 microns in diameter. Conversely, if drying conditions are adjusted to minimize the oversize particles (greater than 74 microns), an appreciable amount of fines is formed.

Although it is possible to eliminate fines and oversize particles by sieving and various other particle classification methods, such procedures add expensive additional steps to the overall production of the waferboards. It would therefore be desirable to be able to obtain greater control of the particle size distribution during the spray drying of the resin solution so that the spray dryer output yields a larger percentage of particles in the 10 to 74 micron range.

Apparatus and methods are known which can produce macrospherical particles of antiperspirant materials, such as aluminum, zirconium and magnesium compounds and complexes, with particle size distributions predominantly in the 10 to 74 micron range. Such methods and apparatus are described in U.S. Pat. Nos. 4,089,120; 4,147,766 and 4,430,155, all assigned to the same assignee as the present invention. The process described in U.S. Pat. No. 4,089,120 and 4,147,766 comprises providing a solution containing the materials from which the particles are made, diffusing the solution through small pores by centrifugal force such that the resulting solution droplets have a diameter greater than the pore diameter, and drying said solution droplets in a stream of heated air. The apparatus described in these patents comprises a centrifugal atomizer having a porous sintered metal filter ring which is rotated inside a spray drying chamber.

The process of U.S. Pat. No. 4,430,155 comprises providing a solution containing the materials from which the particles are made, dispersing the solution from a central source outwardly along a plurality of radially disposed bristles by centrifugal force to form discreet liquid droplets, and drying the droplets in a stream of heated air to form the particles after the droplets leave the free ends of the bristles. The apparatus of that patent comprises a centrifugal atomizer having a plurality of radially outwardly extending bristles extending from fluid outlets from a generally centrally located solution source, the atomizer being rotated in a spray drying chamber.

Although these three patents prophetically mention the possibility of using those methods and apparatus for the production of macrospherical particles having many areas of use, including pigments, resins, catalysts, etc., the preferred use of such methods and apparatus was to produce particles of antiperspirant material. There was no specific suggestion in those patents of using the methods and apparatus for spray drying any specific resins, and to our knowledge, until the present invention none of these methods or apparatus had been used to spray dry any resins. Moreover, in view of the high feed rates which are required in the spray drying of phenolic and other thermosetting resins for the waferboard industry, it was not expected that the porous metal atomizers and methods of U.S. Pat. No. 4,089,120 and 4,147,766 would be suitable for spray drying resins of this type.

BRIEF SUMMARY OF THE INVENTION

It has now been discovered that the porous metal atomizers and methods of our prior U.S. Pat. Nos. 4,089,120 and 4,147,766 can greatly alleviate the above-mentioned problems of the production of thermosetting resin powders for the waferboard industry In addition, such methods and apparatus provide unexpected advantages which can significantly improve the economies of waferboard production.

According to the invention spray dried thermosetting resin powder in an intermediate polymeric stage is produced in the form of hollow, thick-walled, macrospherical particles having a bulk density greater than 35 lbs/ft$^3$ and having particle diameters predominantly in the range of 10 to 74 microns and preferably averaging about 30 microns. The macrospherical thermosetting resin particles are made by centrifugal atomization of a concentrated solution of the resin through a porous sintered metal filter, preferably without substantially preheating or diluting the solution, and without raising the temperature of the resinous material above about 160° F. during the spray drying process.

The thermosetting resin molding powder of the invention is preferably a phenol formaldehyde resin, but other conventional thermosetting resins used in waferboard manufacture, such as urea formaldehydes, melamine formaldehydes, polyhydroxy or lignin-modified phenol formaldehydes, and mixtures thereof may be used. The macrospherical thermosetting resin particles of the invention may be used in dry process molding procedures for making consolidated wood fiber structures, wherein substantially dry wood fiber elements are mixed with the resin molding powder and consolidated under sufficient heat and pressure to cause the powder to melt, flow and cure. Preferably at least about 90% of the resin particles have diameters between about 10 and 74 microns.

DETAILED DESCRIPTION OF THE PREFERRED EMBODIMENTS

The thermosetting resinous materials useful in the present invention may be any of a wide variety of resins which are used in dry process manufacture of waferboards and the like and are susceptible of being placed in solution which may be spray dried to a powder form. Examples of suitable thermosetting resinous materials which may be used in the present invention and are known in the art include phenol formaldehydes, urea formaldehydes, melamine formaldehydes, polyhydroxy-modified or lignin-modified phenol formaldehydes and mixtures of the above. Other suitable resins which are soluble in water or other liquid media for spray drying will be apparent to those skilled in the art.

The most commonly used thermosetting resins used in the dry process molding of consolidated fiberboards such as waferboard are the phenol formaldehyde resins, often referred to simply as phenolics or phenolic adhesives or binders, including modified phenol formaldehydes such as the polyhydroxy modified phenol formaldehydes described in U.S. Pat. No. 4,098,770 or the lignin-modified phenolics described in U.S. Pat. No. 4,537,941, for example. A large number of phenolics suitable for use in the present invention are commercially available from a number of companies, including Reichhold Chemicals Limited, Bakelite Thermosets Limited, Borden Chemical Company, Georgia-Pacific Corp., and others.

The thermosetting resins used in the manufacture of dry process consolidated board are used in an intermediate polymeric stage which is thermoplastic and has a relatively low softening point so that it can melt and flow under the temperatures and pressures used to consolidate the wood fiber elements. In addition, during this consolidation step, the heat applied serves to cure the resin from the intermediate or thermoplastic stage to the final or thermoset stage, so that the final board product will not subsequently soften when subjected to heat. As a result, it is necessary to carefully control the spray drying temperatures so that the intermediate stage resin is not prematurely cured.

Often in the manufacture of waferboard two or more different resins are used, including core resins and face resins. The core resins are used in mixtures which form the center of the waferboard, whereas face resins are used in the mixtures which form the faces of the waferboard. Since the core resins are further removed from the pressing platens during consolidation, they receive less of the heat of consolidation and must therefore be resins which require less heat to cure. In contrast, the face resins receive more heat from the pressing platens and therefore may be resins which require more heat to cure. The present invention is intended to cover both core and face resins, as well as combination resins which are used for both purposes.

Commercially available thermosetting resins are typically provided in viscous aqueous solutions containing about 40 to 45 weight percent resin solids. Such solutions are too viscous to spray dry by conventional means, and if viscosity is not lowered, a significant percentage of stringy particles and particles substantially greater than 74 microns in diameter is obtained from the spray dryer.

Accordingly, it is normal practice to dilute the concentration of the resin solution to about 30 weight percent resin solids and/or preheat the dilute solution to about 200° F. to lower the viscosity for purposes of atomization of the solution. For example, a concentrated aqueous solution may be diluted with steam to both heat and lower the concentration of the solution at the same time.

Even with heating and dilution of the feed solution for the spray dryer, conventional atomizers do not produce powders meeting the narrow particle size distributions which are most desirable in the waferboard and chipboard industry. Moreover, since many thermoset resins cure in a matter of a few minutes at 200° F., the preheating of the feed solution runs the risk of precuring the resin. The resulting powder is relatively unstable, has a shorter shelf life, and exhibits poorer flow characteristics.

In prior art situations where the resin solution is used at higher feed concentrations, it is necessary to substantially reduce the feed rate to the atomizer. As a result, one of the major advantages of using higher concentration feed solutions, namely increased resin throughput, is lost.

Spray drying machines conventionally used in the production of powders from solutions, suspensions and slurries include those made by Niro Atomizer, Bowen Engineering, Inc., Barr & Murphy Ltd. and Anhydro Corp. The Barr & Murphy spray dryers are especially designed for the spray drying of phenolics. In conventional spray drying processes used in the spray drying of phenolics, these spray dryers are typically provided with centrifugal atomizers in the form of spinning plate distributors in which the feed solution is supplied to the underside of the spinning plate and spun off the rounded or sharp edges of the plate by centrifugal force.

While virtually any of the spray dryers of the prior art may be used in the production of thermosetting resin binder particles of the present invention, the atomization of the particles in the spray drying chamber according to the invention is carried out by centrifugal atomization of the type described and claimed in our prior U.S. Pat. Nos. 4,089,120 and 4,147,766, the disclosures of which are incorporated herein by reference. As described above, such atomization consists of diffusing a feed solution of the resin through small pores, particularly the pores of a porous sintered metal filter, by centrifugal force, with the pores having a nominal diameter smaller than that of the desired particles, preferably a nominal pore size of about 20 microns. Using the methods and apparatus of our prior patents, hereinafter referred as porous metal atomization, we have found that the production of thermosetting resin molding powder, for use in the manufacturing of waferboard and other consolidated wood fiber structures is significantly and unexpectedly improved, both in the quality of the resin particles produced and in the processing conditions and economics.

According to the present invention, it has been found that the concentrated solutions of thermosetting resinous material may be spray dried at high production rates using the porous metal atomization, without the necessity of either diluting or preheating the concentrated solution. That is, relatively viscous resin solutions containing about 35 to 50 weight percent resin solids, and preferably about 40 to 45 weight percent resin solids, may be fed to the spray dryer without dilution or preheating. Throughput of resin is thereby increased since the design evaporative capacity of the dryer can still be achieved or closely approached even with the higher percentage of solids.

Of course, it will be understood by those skilled in the art that dilution to about 30% or less by weight resin solids and/or preheating up to about 200° F. may still be used with the porous metal atomization according to this invention while still obtaining hollow, high density, thick-walled macrospherical particles having particle diameters predominantly in the desired range of about 10 to 74 microns. However, such preheating and/or dilution are unnecessary and will result in loss of some of the important advantages of the present invention, both in processing economics and particle properties.

Without preheating of the feed solution, the resin is generally not heated to more than about 160° F. when subjected to the hot air stream of the spray dryer, and more normally the resin solution is heated in the spray dryer to only about 140° F. to 150° F. maximum. As a result, there is considerably less danger of precuring the thermoset resin, and the final powder product is more stable and more reproducible than with conventionally spray dried resin particles.

The ability to use higher concentration, viscous resin solutions using porous metal atomization not only improves the throughput and capacity of the spray dryer, but also improves the economics of the particle production since less water needs to be evaporated, and hence less hot air needs to be used per unit weight of resin particles. The use of porous metal atomization also improves the operating performance of the spray dryer, leaving less resin build-up on the dryer walls, higher yields of dry powder particles and less severe requirements for cooling the resin powder. Elimination of the necessity for preheating or diluting of the feed solution also requires less handling since the resin solution may be used as is in its concentrated form.

Other processing advantages are obtained depending upon the particular type of spray dryer used with the porous metal atomizer. For example, Barr & Murphy spray dryers which are commonly used in the production of phenolic powders usually use a supplemental air stream referred to as "ring jet air" for producing the resin particles. However, using the porous metal atomization according to the present invention, ring jet air is not required. As a result, the air normally diverted to the ring jet may be recombined with the main drying air stream, thereby increasing the output of the dryer by as much as 12%.

The sizes of the resin particles according to the present invention may be measured by any of a variety of techniques well known in the art, including various wet and dry sieving methods, as well as more advanced light scattering particle size determinations. The experimental work in connection with the present invention, including the particle size determinations set forth below, has used a laser light-scattering determination, in particular a laser light-scattering particle size analyzer sold under the trademark "GRANULOMETRE", model 715, manufactured by Cilas (France). This analyzer examines the particles by light-scattering in a suspension of the particles in a non-solvent for the resin. The particle size distribution is given in a printout showing the cumulative percent of the total particles which are smaller than certain diameters, such as smaller than 74 microns, which corresponds to particles passing through a 200 mesh sieve screen.

Thermosetting resin molding powders of the present invention produced by porous metal atomization with a nominal pore size of about 20 microns have a particle size distribution predominantly in the range of about 10 to 74 microns. More particularly, the particles have an average particle diameter of about 30 microns, with at least 90% of the particle diameters falling in the range between 10 and 74 microns, and preferably 95% or more of the particle diameters falling within this range.

Since our prior patents it has been found that particle size is more a function of centrifugal acceleration (force) than centrifugal or peripheral speed - if the speed and force are increased, the fines become too high, and if the speed and force are reduced, the particles become too large and wet. According to the invention the centrifugal atomization occurs at a centrifugal acceleration of at least 175,000 ft/sec/sec and preferably greater than about 300,000 ft/sec/sec.

The resin particles of the invention are hollow, thick-walled macrospherical particles having a bulk density greater than about 35 lbs/ft$^3$, and preferably 35-45 lbs./ft$^3$, which is about twice as dense as prior art thermosetting resin particles (about 20-25 lbs/ft$^3$) produced by spray drying. Less fines are produced, hence losses up the stack of the spray dryer are reduced. While present spray drying techniques in large scale spray dryers claim to obtain a yield of 98 to 99 weight percent based on the feed solution, it is expected that the present invention will have yields in excess of 99 weight percent on a large scale, thus precluding potential environmental problems.

The resin particles of the present invention have particular advantages for use in the production of waferboard and similar dry process consolidated boards. Although we have not yet made large scale or commercial runs of waferboard with the particles of the present invention, it is anticipated that the following properties of the resin particles of the invention will substantially improve the economics as well as the processing and product characteristics of waferboard manufacture.

In addition to alleviating the health, safety and housekeeping problems encountered with resin powders having high percentages of fines, the narrower, more uniform particle size distribution of the resin particles of the invention should allow the use of less resin material since the more uniform product will provide more even mixing and coating of the wood fiber elements, and the smaller number of oversize particles also should allow better dispersion and mixing of the powder with the fiber elements.

It has also been found in simple tests where a weight is placed on the powder particles with heat that there is a much better spread of the resin, i.e., much better flow of the product in the melt state. As a result, it is expected that there will be much better coating of the fiber elements with the resin in waferboard production. While we do not wish to be bound by any particular theory, it is believed that the preheating of the resin solution in the usual spray drying of thermosetting resins results in thermal degradation (precuring) of the powder, thereby causing worse flow properties. Additionally, fines: i.e., particles less than 10 microns in diameter, will tend to over-dry relative to larger particles in a given spray drying operation. This over-drying will also contribute to thermal degradation with its concomitant decreasing of the "flow property" of the resin. The lesser degree of thermal degradation of the particles of the present invention also gives the powder product a longer shelf life and more stability for shipping and storage.

The higher bulk density of the particles of the present invention will result in freight savings where shipping is by volume, e.g. for rail shipment. This higher density coupled with the narrower particle size distribution obtained using the porous metal atomizer poses less of a safety hazard due to the reduced tendency to respire these particles.

It is generally contemplated that the resin particles of the present invention may be used in any dry molding process for the production of consolidated wood and other fiber structures which generally comprises the steps of mixing the elements to be consolidated with a thermosetting resin molding powder in an intermediate polymeric stage and consolidating the elements under sufficient heat and pressure to cause the resin powder to melt, flow and cure. Generally, the wood fiber or similar elements should be substantially dry (less than 25% moisture), and the resin powder should have a moisture content of about 5% by weight. Significantly greater moisture in the resin powder may result in a sticky non-flowing product, whereas drying to significantly less moisture may result in thermal degradation of the resin and improper cure.

The invention will now be illustrated in more detail by reference to the following specific, non-limiting examples and comparisons.

EXAMPLE 1

A 43% solids aqueous solution of phenol formaldehyde core resin supplied by Bakelite Thermosets Limited was spray dried in a 30 inch diameter Bowen laboratory cone bottom spray dryer provided with a 1.5 inch diameter porous sintered metal centrifugal atomizer according to the invention of our prior U.S. Pat. No. 4,089,120. The feed solution of phenol formaldehyde resin was neither diluted nor preheated and was fed to the atomizer at room temperature at a rate of 60 mls per minute. The outlet air temperature of the spray dryer was about 90 degrees centigrade. The porous metal atomizer was rotated at a speed of 16,000 RPM. At the completion of the run, the powder was allowed to cool normally to room temperature without any special cooling provisions. The particle size distribution was measured with a Cilas GRANULOMETRE 715 laser light-scattering particle size analyzer, and the distribution is shown in Table I, with the numbers for each example showing the cumulative percentage of dry recovered powder smaller than each diameter size indicated. As indicated, greater than 94% of the particle sample collected by this example had diameters in the range of 10 to 74 microns.

EXAMPLE 2

Example 1 was repeated using the same resin solution except that about ½ fluid ounce of a surfactant was added to every two liters of solution for the purpose of reducing dusting. The yield of dry powder recovered was 60%, which means that about 40% was lost to the stack of the dryer or the dryer walls. Although this yield is low by commercial standards, laboratory scale dryers generally give much lower yields due to the small amount of throughput and the losses normally incurred in start-up before reaching an equilibrium condition. The particle size distribution of the dry recovered powder from this example is also indicated in Table I. Greater than 94% of the particle sample collected was between 10 and 74 microns in diameter.

EXAMPLE 3

Example 2 was repeated with the same solution, but instead of a porous metal atomizer, a conventional spinning disc of the centrifugal sharp edge (CSE) type was used as the atomizer. The disc had a 2 inch diameter and a rotational speed of 13,800 RPM, which corresponded to the same centrifugal acceleration as in Examples 1 and 2. The yield of dry powder was only 40 weight percent implying that a substantially greater amount of material was produced outside of the 10 to 74 micron diameter range than in example 2 where the yield was 60% given identical atomizing, drying, and run-duration conditions. The particle size distribution of the dry recovered powder is shown in Table I. About 83% of the particle sample collected was between 10 and 74 microns in diameter and about 15% was greater than 74 microns.

EXAMPLES 4 and 5

Two commercially available resins were obtained in powder form and analyzed for particle size distribution in the same manner as Examples 1–3 above. The resin of Example 4 was a core type resin of Bakelite Thermosets Limited sold under the product designation BRP 911. The resin of Example 5 was a combination resin powder distributed by Reichhold Chemicals Limited under the product designation BD 019. As seen in Table I only 76% of the resin of Example 4 and 85% of the resin of example 5 had particles in the desired range of 10 to 74 microns.

TABLE I

| Particle Diameter (microns) | Example 1 | Example 2 | Example 3 | Example 4 | Example 5 |
|---|---|---|---|---|---|
| 10 | 2.7 | 2.9 | 2.2 | 20.0 | 8.5 |
| 37 | 36.5 | 49.2 | 42.1 | 74.1 | 57.4 |
| 44 | 54.5 | 66.6 | 55.3 | 83.7 | 71.5 |
| 53 | 73.7 | 82.4 | 67.5 | 89.8 | 82.4 |
| 74 | 96.0 | 97.4 | 85.3 | 96.0 | 93.5 |

Cumulative weight percent of particles less than indicated diameter.

The present invention may be embodied in other specific forms without departing from the spirit or essential attributes thereof and, accordingly, reference should be made to the appended claims, rather than to the foregoing specification as indicating the scope of the invention.

We claim:

1. A spray dried powder of thermosetting resinous material in an intermediate polymeric stage, said powder comprising hollow, thick-walled, macrospherical particles consisting essentially of thermosetting resinous material, said particles having a bulk density greater than about 35 lbs/ft$^3$ and having diameters predominantly between about 10 and 74 microns.

2. A powder according to claim 1 wherein said particles have an average diameter of about 30 microns.

3. A powder according to claim 1 wherein said thermosetting resinous material is selected from the group consisting of phenol formaldehydes, urea formaldehydes, melamine formaldehydes, polyhydroxy- or lignin-modified phenol formaldehydes, and mixtures thereof.

4. A powder according to claim 1 wherein at least 90 percent of said particles have diameters between about 10 and 74 microns and few of said particles have diameters greater than 74 microns.

5. A powder according to claim 1 wherein said resinous material has not been heated above 160° F. during the spray drying of said powder.

6. A powder according to claim 5 wherein said resinous material has not been substantially preheated prior to spray drying.

7. A powder according to claim 1 wherein said powder has a moisture content of about 5 weight percent.

8. A powder according to claim 1 wherein said powder was formed by centrifugal atomization from a 35 to 50 weight percent resin solids solution at a centrifugal acceleration of at least 175.000 ft/sec/sec through pores of porous sintered metal.

9. A powder of thermosetting resinous material made by spray drying a concentrated, viscous solution of thermosettting resinous material by atomization of the solution into a stream of heated air, the improvement comprising atomizing the concentrated, viscous solution through small pores by centrifugal forece, said pores having a nominal diameter smaller than that of the desired particles, whereby hollow thick-walled macrospherical particles of thermosetting resinous material are formed having a bulk density greater than about 35 lbs/ft$^3$ and particle diameters predominantly between about 10 and 74 microns.

10. A powder according to claim 1 having a bulk density of about 35 to 45 lbs/ft$^3$.

11. A powder according to claim 9 wherein said particles have an average diameter of about 30 microns.

12. A powder according to claim 9 wherein said thermosetting resinous material is selected from the group consisting of phenol formaldehydes, urea formaldehydes, melamine formaldehydes, polyhydroxy-or lignin-modified phenol formaldehydes, and mixtures thereof.

13. A powder according to claim 9 wherein at least 90 percent of said particles have diameters between about 10 and 74 microns and few of said particles have diameters greater than 74 microns.

14. A powder according to claim 9 wherein said resinous material has not been heated about 160° F. during the spray drying of said powder.

15. A powder according to claim 9 wherein said resinous material has not been substantially preheated prior to spray drying.

16. A powder according to claim 9 wherein said powder has a moisture content of about 5 weight percent.

17. A powder accordingdf to claim 9 wherein said particles are formed from a 35 to 50 weight percent resin solids solution at a centrifugal acceleration of at least 175,000 ft/sec/sec/ through pores of porous sintered metal.

18. A powder according to claim 9 wherein said solution has a concentration of about 35 to 50 weight percent resin solids.

19. A powder according to claim 9 wherein said solution is an aqueous solution.

20. A powder according to claim 9 wherein said centrifugal force is at least 175,000 ft/sec/sec.

21. A powder according to claim 9 wherein said resinous material is a phenol formaldehyde.

22. A powder according to claim 9 wherein said pores comprise a peripheral ring of porous sintered metal.

23. A powder according to claim 9 having a bulk density of about 35 to 45 lbs/ft$^3$.

* * * * *